United States Patent
Codrescu et al.

(10) Patent No.: US 8,990,543 B2
(45) Date of Patent: Mar. 24, 2015

(54) SYSTEM AND METHOD FOR GENERATING AND USING PREDICATES WITHIN A SINGLE INSTRUCTION PACKET

(75) Inventors: Lucian Codrescu, Austin, TX (US); Robert Allan Lester, Round Rock, TX (US); Charles Joseph Tabony, Austin, TX (US); Erich James Plondke, Austin, TX (US); Mao Zeng, Austin, TX (US); Suresh Venkumahanti, Austin, TX (US); Ajay Anant Ingle, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 983 days.

(21) Appl. No.: 12/045,825

(22) Filed: Mar. 11, 2008

(65) Prior Publication Data
US 2009/0235051 A1   Sep. 17, 2009

(51) Int. Cl.
*G06F 15/80* (2006.01)
*G06F 9/38* (2006.01)
*G06F 9/30* (2006.01)

(52) U.S. Cl.
CPC ............ *G06F 9/3853* (2013.01); *G06F 9/3889* (2013.01); *G06F 9/30036* (2013.01); *G06F 9/3826* (2013.01); *G06F 9/30069* (2013.01); *G06F 9/3828* (2013.01)
USPC ......................................................... 712/24

(58) Field of Classification Search
None
See application file for complete search history.

(56) References Cited

U.S. PATENT DOCUMENTS

| 6,035,122 A | 3/2000 | Ando | |
|---|---|---|---|
| 6,041,399 A * | 3/2000 | Terada et al. | 712/24 |
| 6,513,109 B1 * | 1/2003 | Gschwind et al. | 712/200 |
| 7,412,591 B2 | 8/2008 | Ma et al. | |
| 7,949,861 B2 | 5/2011 | McIlvaine et al. | |
| 2004/0205326 A1 * | 10/2004 | Sindagi et al. | 712/226 |
| 2006/0174089 A1 * | 8/2006 | Altman et al. | 712/24 |
| 2006/0212681 A1 * | 9/2006 | Codrescu et al. | 712/214 |
| 2006/0271768 A1 | 11/2006 | Williamson et al. | |

FOREIGN PATENT DOCUMENTS

| CN | 1869920 A | 11/2006 |
|---|---|---|
| JP | H08153000 A | 6/1996 |

(Continued)

OTHER PUBLICATIONS

David Chu Lin ("Compiler Support for Predicated Execution in Superscalar Processors") 1992.*
Kim et al. ("Diverge-Merge Processor: Generalized and Energy-Efficient Dynamic Pedication") Feb. 2007.*

(Continued)

*Primary Examiner* — Jacob A Petranek
(74) *Attorney, Agent, or Firm* — Peter Michael Kamarchik; Nicholas J. Pauley; Joseph Agusta

(57) ABSTRACT

In a particular embodiment, a method is disclosed that includes receiving an instruction packet including a first instruction and a second instruction that is dependent on the first instruction at a processor having a plurality of parallel execution pipelines, including a first execution pipeline and a second execution pipeline. The method further includes executing in parallel at least a portion of the first instruction and at least a portion of the second instruction. The method also includes selectively committing a second result of executing the at least a portion of the second instruction with the second execution pipeline based on a first result related to execution of the first instruction with the first execution pipeline.

34 Claims, 7 Drawing Sheets

(56) References Cited

FOREIGN PATENT DOCUMENTS

| | | |
|---|---|---|
| JP | 2000081973 A | 3/2000 |
| JP | 2001051845 A | 2/2001 |
| JP | 2001175473 A | 6/2001 |
| TW | 200809516 A | 2/2008 |
| TW | 200809532 A | 2/2008 |
| WO | 9833115 | 7/1998 |
| WO | 0045282 A1 | 8/2000 |
| WO | 2007100487 A3 | 11/2007 |

OTHER PUBLICATIONS

Patterson et al., "Computer Architecture a Quantitative Approach", Second Edition, 1995, pp. a-36, A-37, C-8 and C-9.*

Abnous et al., "Pipelining and Bypassing in a VLIW Processor", Jun. 1994.*

International Search Report—PCT/US09/035372, International Search Authority—European Patent Office—May 27, 2009.

Written Opinion—PCT/US09/035372, International Search Authority—European Patent Office—May 27, 2009.

Taiwan Search Report—TW098107159—TIPO—Jul. 5, 2012.

* cited by examiner

//www.w3.org/1999/xhtml">

SYSTEM AND METHOD FOR GENERATING AND USING PREDICATES WITHIN A SINGLE INSTRUCTION PACKET

I. FIELD

The present disclosure is generally related to a system and method of selectively committing a result of an executed instruction.

II. DESCRIPTION OF RELATED ART

Many algorithms selectively perform an operation based on some condition. In software code, such selective performance may be accomplished using a compare instruction followed by a branch instruction that optionally skips over portions of the code based on the results of the compare operation. Some architectures can allow the operation itself to execute conditionally, thereby eliminating the branch operation. However, there is still a dependency on the result of the particular condition.

Typically, in a Very Long Instruction Word (VLIW) processor architecture, a compare operation may be performed and a result from the compare instruction is available after some positive number of processor cycles. In computer programs, a compare operation is often followed by a branch operation, where a result of the compare operation is used to determine whether to execute a branch operation. Typically, a compiler is used to organize instructions to reduce pipeline stalls due to such dependencies.

In non-VLIW processor architectures, it is common to utilize branch prediction techniques to speculatively eliminate the dependency of branches. However, such branch prediction increases complexity and increases power consumption of the processor core. Since VLIW processor architectures have many in-flight instructions that are grouped by software, branch prediction is typically limited or non-existent in VLIW processor architectures. Nevertheless, dependencies between compare and branch operations still exist Hence, there is a need for an improved processor architecture to reduce pipeline stalls due to instruction dependencies.

III. SUMMARY

In a particular embodiment, a method is disclosed that includes receiving an instruction packet including a first instruction and a second instruction that is dependent on the first instruction at a processor having a plurality of parallel execution pipelines, including a first execution pipeline and a second execution pipeline. The method further includes executing in parallel at least a portion of the first instruction and at least a portion of the second instruction. The method also includes selectively committing a second result of executing at least a portion of the second instruction with the second execution pipeline based on a first result related to execution of the first instruction with the first execution pipeline.

In another particular embodiment, a method is disclosed that includes receiving an instruction packet including a compare instruction and a second instruction at a processor having a plurality of parallel execution pipelines. The second instruction is dependent on the compare instruction. The method further includes decoding the compare instruction and the second instruction to determine a prediction related to whether the second instruction will be committed, executing the first instruction and the second instruction in parallel, and selectively steering a fetch pipeline based in part on the second instruction and on the prediction.

In still another particular embodiment, a processor includes multiple execution pipelines adapted to execute instructions in parallel. The multiple execution pipelines include a first execution pipeline to execute a compare instruction and a second execution pipeline to execute a second instruction that is dependent on the compare instruction. The compare instruction and the second instruction are executed concurrently. The processor also includes logic circuitry adapted to provide a first result from the first execution pipeline determined from execution of the compare instruction to the second execution pipeline for use by the second instruction.

One particular advantage provided by embodiments of the system and methods is that a compiler can group a compare instruction with a branch instruction that uses the result of the compare instruction into a single packet for concurrent execution by a processor without introducing dependency-related latencies.

Another particular advantage is provided in that the compare instruction can be grouped with and executed in parallel with other instructions, such as arithmetic and memory load instructions, which depend on the result of the compare operation. Still another particular advantage is provided in that these instructions can use the result of the compare instruction in the same cycle and before the execution unit needs to commit its results, thereby preventing an unnecessary write operation.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
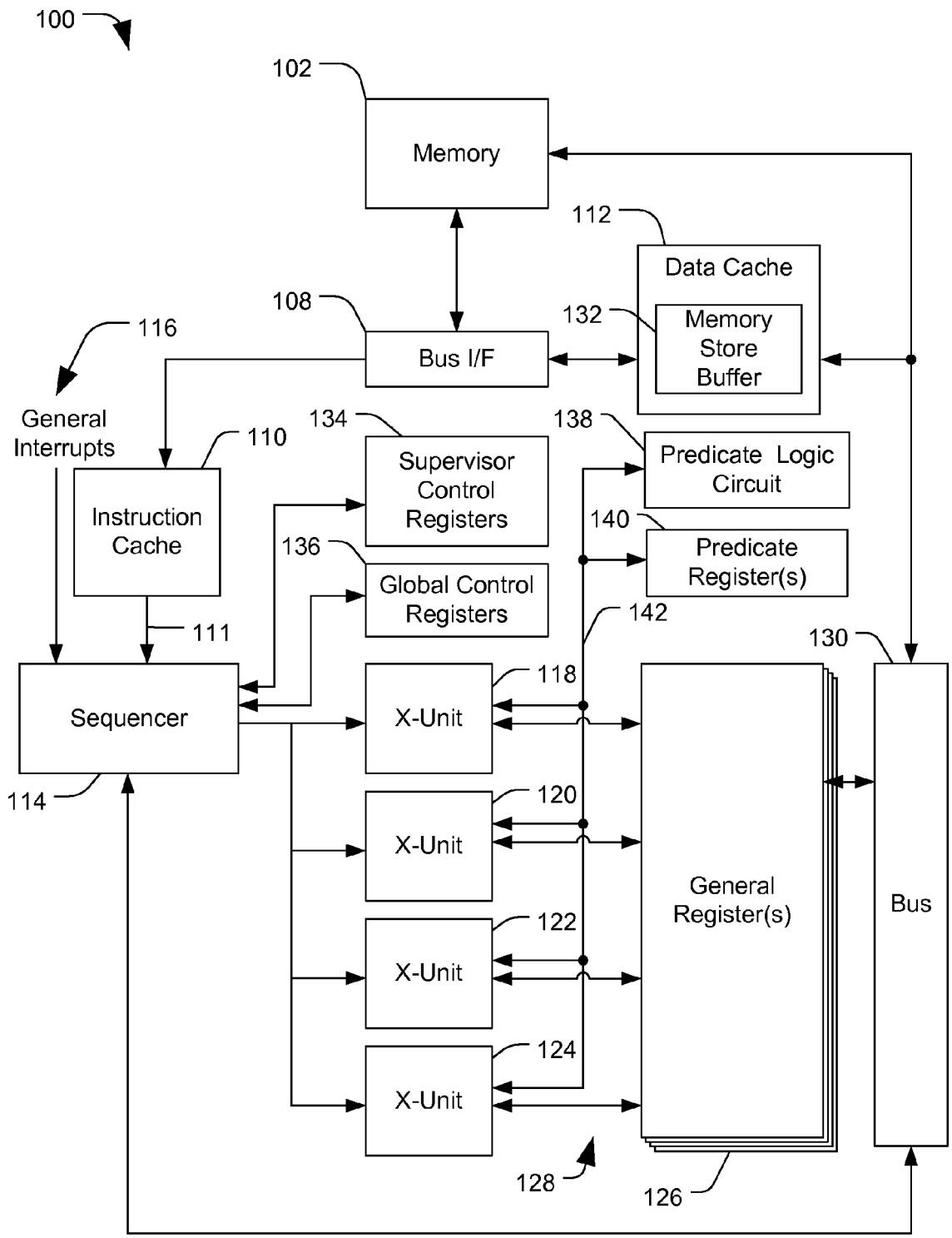
FIG. 1 is a block diagram of a particular illustrative embodiment of a processor including logic to conditionally commit parallel-executed instructions.

FIG. 1 is a block diagram of a particular illustrative embodiment of a processor 100 including logic to conditionally commit parallel-executed instructions. The processor 100 includes a memory 102 that is coupled to an instruction cache 110 via a bus interface 108. The processor 100 also includes a data cache 112 that is coupled to the memory 102 via the bus interface 108. The instruction cache 110 is coupled to a sequencer 114 via a bus 111. The sequencer 114 also receives general interrupts 116, which may be retrieved from an interrupt register (not shown). In a particular embodiment, the instruction cache 110 may be coupled to the sequencer 114 via a plurality of current instruction registers, which may be coupled to the bus 111 and associated with particular threads of the processor 100. In a particular embodiment, the processor 100 is an interleaved multi-threaded processor including six threads.

In a particular embodiment, the bus 111 is a one-hundred twenty-eight bit (128-bit) bus and the sequencer 114 is configured to retrieve instructions from the memory 102 via instruction packets that include multiple instructions having a length of thirty-two (32) bits each. The bus 111 is coupled to a first instruction execution unit 118, a second instruction execution unit 120, a third instruction execution unit 122, and a fourth instruction execution unit 124. Each instruction execution unit 118, 120, 122, 124 can be coupled to a general register file 126 via a first bus 128. The general register file 126 can also be coupled to the sequencer 114, the data cache 112, and the memory 102 via a second bus 130. In a particular illustrative embodiment, the data cache 112 may include a memory store buffer 132 to provide a temporary storage location for the data to be stored based on a condition that is not yet determined.

The processor 100 may also include a supervisor control registers 134 and global control registers 136 to store bits that may be accessed by control logic within the sequencer to determine whether to accept interrupts and to control execution of instructions. The processor 100 also includes a predicate logic circuit 138 and predicate registers 140, which are coupled to the execution units 118, 120, 122 and 124. In a particular embodiment, the predicate registers 140 can include four read/write 8-bit registers that hold the result of scalar and vector compare operations. The compare results may be written to the predicate registers 140 by the execution units 118, 120, 122, and 124 via a bus 142. The predicate logic circuit 138 is adapted to retrieve data from the predicate registers 140 and to provide the compare results to a selected execution unit that requires the compare result. In a particular example, the predicate logic circuit 138 may be embedded within each execution unit 118, 120, 122 and 124 and may retrieve data from the predicate registers 140 based on the presence of an indicator associated with a branch instruction. For example, the branch instruction may include a bit setting or some other indicator identifying that the conditional data to be used for the branch instruction is the compare result that was included in the same instruction packet. Such an indicator can trigger the predicate control logic to retrieve the compare result from the predicate registers 140.

The predicate logic circuit 138 and the predicate registers 140 are utilized by the processor 100 to provide a result from a compare instruction at an early stage of the execution of a first execution pipeline to a second execution pipeline for use with a branch instruction, a logical operation instruction (i.e., a logical AND, a logical OR, a logical NAND, a logical NOR, a logical exclusive-OR, or other logical operations) a load instruction, a store instruction, an arithmetic instruction, another conditional instruction, or any combination thereof. In a particular embodiment, the predicate logic circuit 138 is adapted to retrieve results from one execution pipeline for use by another execution pipeline to allow a branch to use the predicate within the same execution cycle as the compare result (predicate) was generated. In a particular example, the branch instruction may be executed by the execution unit 120 using a result from a compare instruction executed by the execution unit 118 approximately zero observed cycles after the compare result was computed. While a result of a compare operation in a conventional VLIW architecture is available after a number of cycles, the processor 100 utilizes the predicate logic circuitry 138 to allow the branch instruction to receive the result of the compare operation in the time available from the execution pipeline. Thus, the compare result can be used by a branch instruction of the same instruction packet while the instructions are executing in parallel, i.e., the branch instruction receives the compare result in the same execution cycle as the result of the compare is being determined.

In a particular embodiment, the predicate logic circuit 138 is illustrated as a circuit component that is external to the execution units 118, 120, 122, and 124. In an alternative embodiment, the predicate logic circuit 138 may be embedded within each of the execution units 118, 120, 122, and 124. In another alternative embodiment, the predicate logic circuit 138 may be included within the sequencer 114.

In a particular illustrative embodiment, packets of instructions are fetched from the instruction cache 134 by the sequencer 114 via the bus 111. The sequencer 114 provides instructions to designated instruction execution units 118, 120, 122, and 124. The instruction execution units 118, 120, 122, and 124 execute the instructions in parallel and, depending on the dependency between instructions, the instruction execution units 118, 120, 122, and 124 are adapted to conditionally commit a result from a second instruction based on a result of a first instruction.

For example, in a particular embodiment, a packet of instructions may include a first and a second instruction, where the second instruction is dependent on a result of the first instruction. The processor 100 is adapted to accept a compare instruction that is grouped with a change of flow instruction (such as a jump instruction, a branch instruction, or other change of flow instructions), a load instruction, a store instruction, an arithmetic instruction, another dependent operation, or any combination thereof. In particular, the processor 100 is adapted to provide a result of a compare operation to the predicate register 140 at a point in the execution pipeline that is early enough that the result can be used within the same execution cycle to determine whether to take a branch, whether to load or store particular data, to determine whether a first result or a second result is correct, or any combination thereof.

In a particular example, the processor 100 may utilize the memory store buffer 132 to temporarily store results from one or more execution units to provide a delay between the calculation of the result and a write back operation that writes the result to the memory 102. The memory store buffer 132 provides a delay when a condition and values are to be provided to the memory 102, for example. Without the memory store buffer 132, the condition and the values may be needed too early for the results to be ready. The memory store buffer 132 provides a sufficient delay to obtain the result of the condition. The predicate logic circuit 138 may control the execution units 118, 120, 122, and 124 to write the results to the memory store buffer 132 until a condition is determined and then to write only one of the results to the memory location according to the determined condition.

For example, the processor 100 can allow a compare instruction and a branch instruction, which is dependent on a result from the compare instruction, to be executed in parallel. For example, the compare instruction may be processed by the execution unit 118 and the branch instruction may be executed concurrently by the execution unit 120. The branch instruction may include a bit or other notation indicating that a compare result should be derived from the compare instruction in the same packet, rather than from a result of a previously executed instruction from another packet. Within the execution pipeline, the predicate logic circuit 138 may cause the result of the compare instruction to be provided to the execution unit 120 so that the result can be used in the branch instruction before the result of the branch is committed. By making the result of the compare operation available early in the execution pipeline, the branch instruction can use the result to determine a correct result before results are committed. Since the branch direction is typically determined early in the pipeline, the branch instruction typically does not have time to fetch a correct next instruction packet to avoid a pipeline stall if a branch is taken. However, in a particular embodiment, the predicate logic circuit 138 may also be adapted to use the early compare result to determine whether the branch is taken and/or to predict whether the data of an execution pipeline will be committed. The predicate logic circuit 138 may communicate with the sequencer 114 (via a bus that is not shown, for example) to initiate a fetch operation to retrieve instructions according to the prediction.

Figure 2:
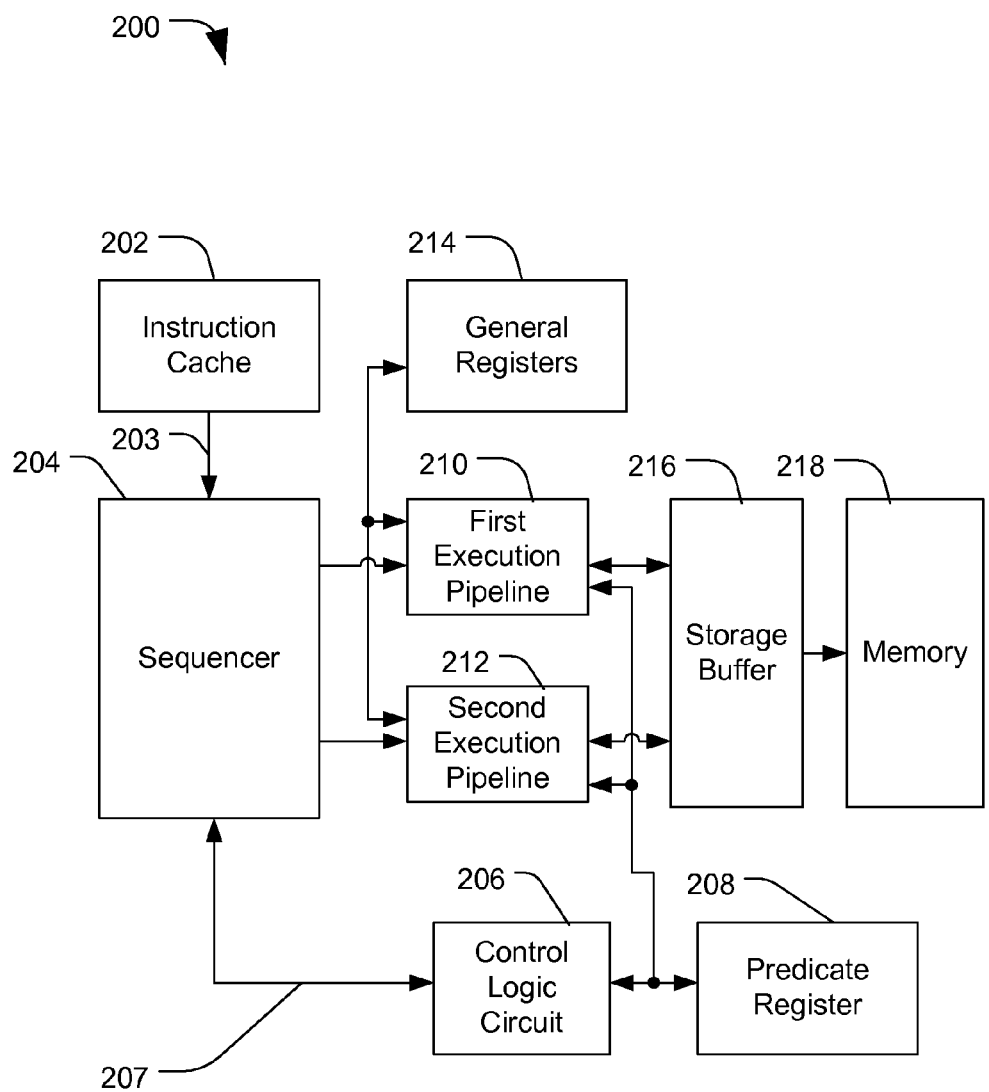
FIG. 2 is a block diagram of a second particular illustrative embodiment of a processor to conditionally commit parallel-executed instructions.

FIG. 2 is a block diagram of a second particular illustrative embodiment of a processor 200 to conditionally commit parallel-executed instructions. The processor 200 includes an instruction cache 202 that communicates with a sequencer 204 via a bus 203. The instruction cache 202 can provide a packet of instructions to the sequencer 204. The sequencer 204 communicates with a first execution pipeline 210 and a second execution pipeline 212 to provide instructions derived from the packet of instructions. The first execution pipeline 210 and the second execution pipeline 212 execute the instructions and conditionally commit results of the instructions to a storage buffer 216 and if a condition is met, to a memory 218. In a particular embodiment the memory 218, such as a data cache, may be coupled to a bus to communicate data to a memory location, such as a location at the memory 102 in FIG. 1.

The processor 200 also includes a control logic circuit 206 and a predicate register 208. The predicate register 208 is adapted to receive results of a compare instructions executed by the first execution pipeline 210 and the second execution pipeline 212. The control logic circuit 206 is adapted to selectively communicate such results from the predicate register 208 to one of the first and second execution pipelines 210 and 212 for use in a parallel-executed instruction. The control logic circuit 206 may also communicate with the sequencer 204 via a bus 207.

In a particular embodiment, the sequencer 204 may receive a packet of instructions that includes a first instruction and a second instruction from the instruction cache 202 via the bus 203. The second instruction may be dependent on a result related to execution of the first instruction. For example, the second instruction may be a branch instruction that uses a result of the first instruction (such as a compare instruction) to determine whether to take a particular branch. The first execution pipeline 210 may execute the first instruction and the second execution pipeline 212 may execute the second instruction in parallel. The first execution unit 210 provides a result of the first instruction (i.e., the compare instruction) to the predicate register 208. The second execution pipeline 212 receives the result from the predicate register 208 and uses the result during execution of the second instruction to determine whether to commit the result of the second instruction. In a particular embodiment, the control logic circuit 206 provides the result to the second execution pipeline 212. In another particular embodiment, the first and second execution pipelines 210 and 212 may include the control logic circuitry 206.

In a particular example, the sequencer 204 may receive a packet of instructions that includes a first compare instruction and a second branch instruction. The second branch instruction may be dependent on a result of a first compare instruction. In a particular example, the second branch instruction may indicate a dependency on the first compare instruction using a notation embedded within the instruction, such as a bit flag or other indicator. During execution of the first compare instruction and the second branch instruction, the first execution pipeline 210 writes the compare result to the predicate register 208. In the same execution cycle, the control logic circuit 206 shares the result with the second execution pipeline 212, which uses the result in the execution of the branch instruction. Concurrently, the control logic circuit 206 may provide a signal to the sequencer 204 via the bus 207 to initiate a fetch operation to retrieve instructions from a memory that are related to the change of flow. The early indication (i.e., the prediction that the execution unit is likely to change the program flow based on the branch instruction) may be used by the sequencer to fetch related instructions to reduce a pipeline latency.

In another particular example, when the first instruction is a compare instruction and the second instruction is a store instruction, the first execution pipeline 210 can write the compare result to the predicate register 208, and the control logic circuit 206 can provide the result to the second execution pipeline 212 before the second execution pipeline commits a result. In this instance, a write back operation associated with the second execution pipeline may be canceled before the write back is initiated. Alternatively, data may be committed temporarily to the storage buffer 216 to provide an additional delay before committing the write back operation, thereby allowing the compare result of the first execution pipeline to be utilized to prevent unnecessary write back operations, where the data from the second execution pipeline is not needed or can be discarded.

In another particular example, the compare instruction can be grouped in a packet with an arithmetic or memory load instruction that depends on the result of the compare instruction. The first execution pipeline 210 can execute the compare instruction and provide the result to the predicate register relatively early in the execution cycle, and the result of the conditional instructions can be canceled before the stage in the pipeline where the results are committed.

In general, the compare instructions are executed and the execution units 210 and 212 set predicate bits in the predicate register 208 based on the compare result. These predicate bits can then be used to conditionally execute certain instructions. Branch instructions, load instructions, store instructions, arithmetic instructions, and multiplex instructions are examples of such conditionally executable instructions. Certain scalar operations can be conditioned on particular bits within the predicate register 208, such as the least significant bit. In contrast, vector operations could utilize more bits from the predicate register 208, depending on the particular code.

In general, the processor 200 may be used to execute data dependent instructions in parallel. Such data-dependent instructions may include arithmetic and other mathematical or logical instructions that use data from a load instruction or a compare instruction, for example. In a particular example, a load instruction may fetch data from a memory location based on the result of a comparison. In a particular embodiment, such conditional or data-dependent instructions may be identified using a particular assembly language notation, such as a dot-new (i.e., ".new,") notation, a dot-dependent (i.e., ".dep,") notation, other notation, or any combination thereof. In a particular example, an assembly language compiler may be adapted to recognize such a notation and to arrange packets of instructions that include such notation in a sequential order. An example of assembly syntax illustrating a conditional load operation to conditionally load a word based on a result of a compare instruction (using a ".new" assembly language notation) appears below:

if (P0.new) R0=MEMW(R2) // load word if P0 is true

In another particular example, a compare instruction may be used to determine which operand to select and the selected operand may be used in the arithmetic operation. An example of assembly syntax illustrating such a conditional arithmetic operation appears below:

if (P0.new) R0=SUB(R2,R3) // subtract if P0 is true if (!P2.new) R2=ADD(R2,#4) // add if P2 is false In another particular example, multiple results may be calculated and the compare result may be used to determine which result should be written to memory. Alternatively, the compare result may be used to determine whether the result should be stored. An example of assembly syntax illustrating a conditional store instruction appears below:

if (!P2.new) MEMW(R4)=R0 // store word if P2 is false

Generally, any number of conditional instructions may be executed, including a conditional transfer, move, or combine instruction. An example of assembly syntax illustrating combine and transfer instructions appear below:

if (P0.new) R1:0=COMBINE(R3,R5) // combine if P0 is true if (!P2.new) R2=R5 // transfer if P2 is false In general, a bit flag, an indicator, or a particular notation, such as the dot-new (".new") notation may be recognized and such code may be grouped in packets to take advantage of the early compare result to enhance processor performance. In particular, the processor can execute instruction packets that include such data-dependent instructions in parallel such that a condition is calculated and the result of the calculated condition is used during execution of the same instruction packet. For example, a result from execution of a compare instruction can be used in another instruction to determine whether to commit the results (i.e., to write the results to a memory). If the condition indicates that the result should not be committed, a writeback operation may be canceled.

An example of how the dot-new notation can be used is presented below in TABLES 1 and 2. Table 1 presents an example segment of C code, and Table 2 presents an assembly implementation of the example C code using the dot-new notation.

TABLE 1

C-Code.

C-code
if (R2==4) {
    R3=*R4;
    else {
    R5=5;
    }
}

A representative example of assembly level code for a processor that supports a dot-new type of notation is presented below in TABLE 2.

TABLE 2

Assembler Code - Dot-New notation.

Assembler Code
{
P0 = cmp.eq(R2,#4)
if (P0.new) R3 = MEMW(R4) // use the newly generated P0
if (!P0.new) R5 = #5
}

In this example, the compare instruction and the multiple uses of the newly generated predicate were grouped in the same packet. As discussed above with respect to FIGS. 1 and 2, the execution units can execute the compare and the dependent instruction in the same execution cycle. In general, instructions in a packet cannot write to the same destination register. The assembler or compiler may flag such packets as invalid. However, conditional instructions are allowed to target the same destination register provided no more than one of the results is committed.

Figure 3:
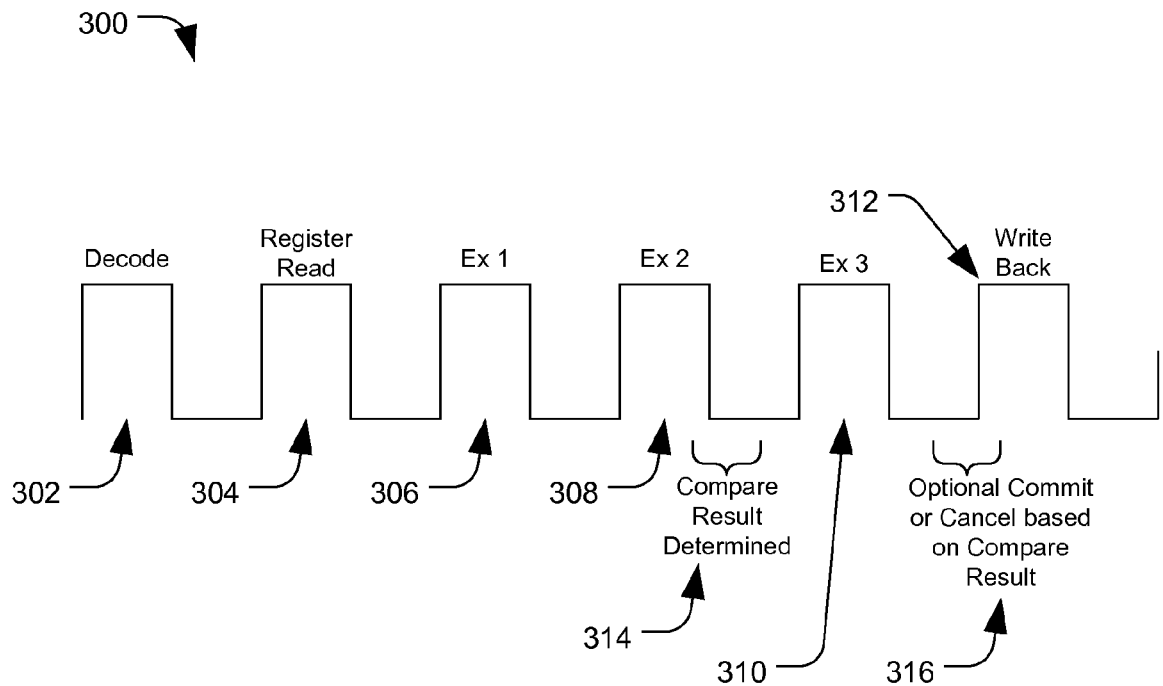
FIG. 3 is a diagram of a particular illustrative example of an execution cycle including multiple execution stages illustrating selective commitment of a second result based on a first result from execution of first compare instruction.

FIG. 3 is a diagram of a particular illustrative example of multiple execution stages associated with an execution pipeline 300. The execution pipeline 300 is adapted to execute a first compare instruction and a second instruction dependent on a result of the first instruction. The execution pipeline 300 includes a decode stage 302, a register read stage 304, a first execution stage 306, a second execution stage 308, a third execution stage 310, and a write back stage 312. In this example, one or more fetch stages are omitted, and the execution pipeline 300 is illustrated as if it begins at the decode stage 302. In a particular example, each of the stages 302, 304, 306, 308, 310, and 312 may represent clock cycles.

In this example, a compare result is determined during the second execution stage, at 314, and the result is used in the third execution stage at 310 to determine whether to commit or cancel the result based on the compare result at 316. Depending on what type of dependent instruction is being processed, the compare result at 314 is provided early enough in the execution pipeline 300 to allow the control logic to steer the fetch pipeline to reduce stalls. The result of the compare at 314 is chosen by the dependent instruction using the "dot-new" notation or indication. Additionally, at the decode stage 302, a prediction can be made as to whether the jump or branch will be taken. In a particular embodiment, the prediction may be made using a static prediction. The predication may be used to steer the fetch pipeline to further reduce stalls when a branch or jump is likely to be taken. In particular, since the result of a compare may not be available until the second execution stage 308, it may be too late to fetch the next instruction without a pipeline stall. However, by adding the prediction (i.e., "jump/branch taken", "jump/branch not taken", other predictions, or any combination thereof), the control logic can fetch subsequent instructions to prevent a pipeline stall if the change of flow occurs. When the static prediction is wrong, the fetch pipeline may be flushed and the next instruction packet may be fetched for processing.

In a particular example, each thread of a multi-threaded processor may decode portions of the entire packet to predict and/or determine whether other execution units will have results that it may need. In another particular example, the write back operation may be canceled, thereby preventing a write operation to the general register file.

In a particular example, it may be necessary for timing purposes to commit to a write back operation in the second execution stage, before the result of the compare is ready (at 314). In this instance, the result may be stored in a temporary buffer, such as the memory store buffer 132 illustrated in FIG.

1. The memory store buffer can commit into memory at some later point in time. In this example, you can delay committing to store the data and use a buffered write to prevent write back operations that should be canceled.

Figure 4:
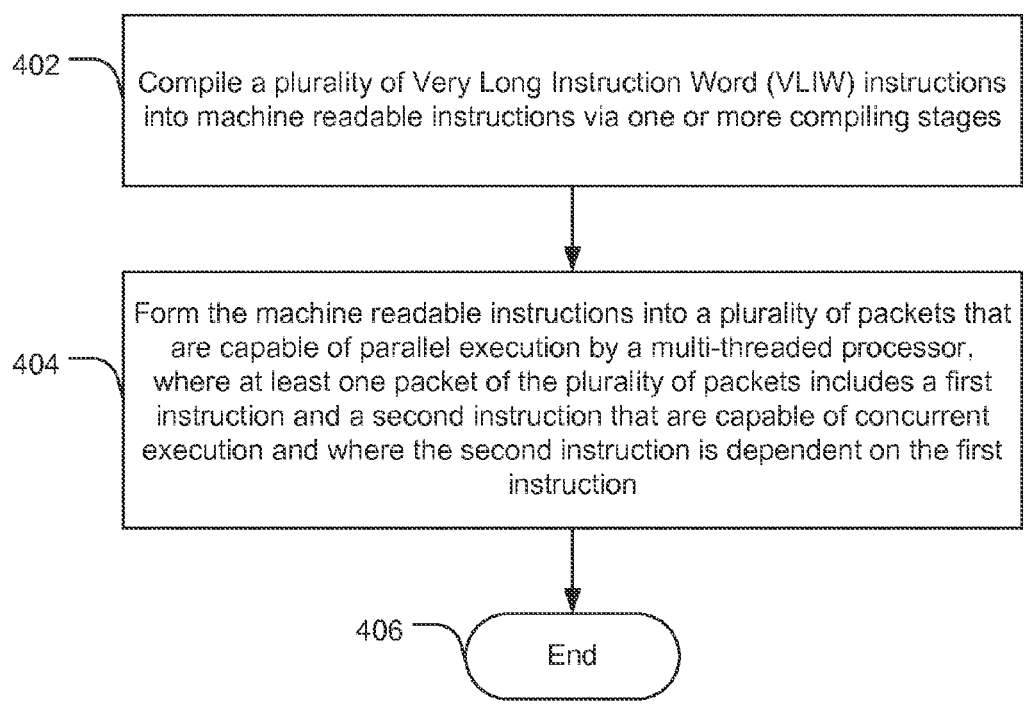
FIG. 4 is a flow diagram of a particular illustrative embodiment of a method of compiling instructions in to packets that include a compare instruction and a second instruction that is dependent on a result of the compare instruction.

FIG. 4 is a flow diagram of a particular illustrative embodiment of a method of compiling instructions in to packets that include a compare instruction and a second instruction that is dependent on a result of the compare instruction. The method includes compiling a plurality of Very Long Instruction Word (VLIW) instructions into machine-readable instructions via one or more compiling stages, at 402. Proceeding to 404, the method further includes forming (i.e. grouping) the machine-readable instructions into a plurality of packets that include instructions, which can be executed in parallel by a multi-threaded processor. At least one packet of the plurality of packets includes a first instruction and a second instruction that are capable of concurrent execution. The second instruction is dependent on the first instruction. The first and second instructions are executed concurrently. In a particular example, a result of the first instruction is used to process the second instruction within the same processing cycle. The method terminates at 406.

In a particular embodiment, a packet of the plurality of packets includes at least two conditional instructions that target a same destination register. While a conventional compiler might return an error, the at least two conditional instructions may be allowed to target the same destination register, provided that only one conditional instructions can be committed.

Figure 5:
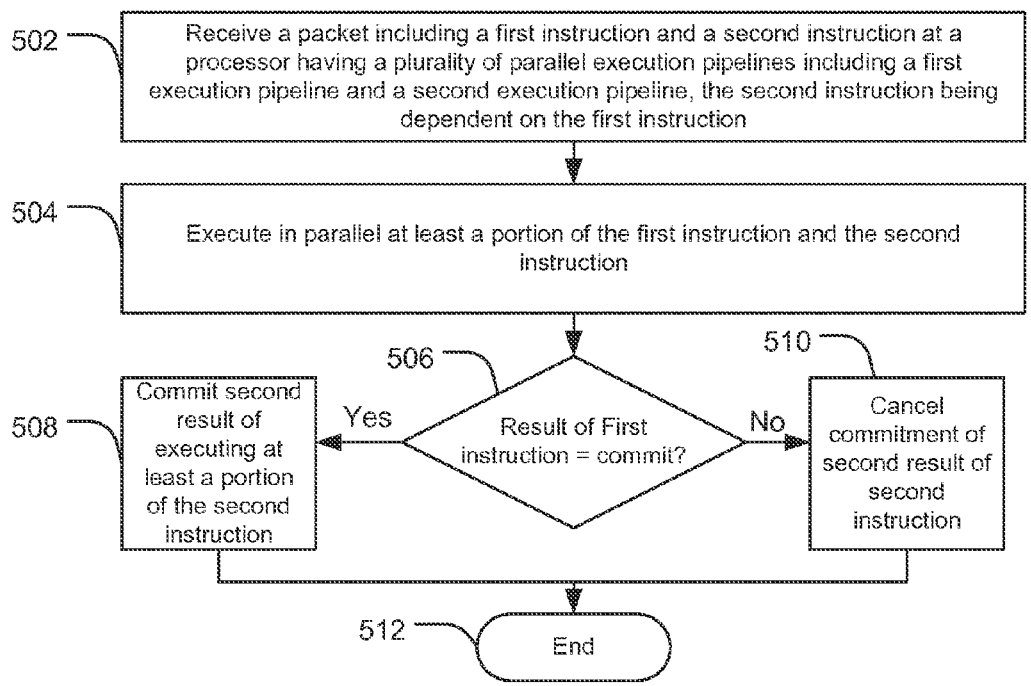
FIG. 5 is a flow diagram of a particular illustrative embodiment of a method conditionally committing parallel-executed instructions.

FIG. 5 is a flow diagram of a particular illustrative embodiment of a method conditionally committing parallel-executed instructions. The method includes receiving a packet including a first instruction and a second instruction at a processor having a plurality of parallel execution pipelines, where the second instruction depends on a result of the first instruction, at 502. The plurality of parallel execution pipelines may include a first execution pipeline and a second execution pipeline. The first instruction may be a compare instruction, and the second instruction may be an instruction that is conditional based on the result of the compare instruction. Advancing to 504, the method includes executing, in parallel, at least a portion of the first instruction and at least a portion of the second instruction. In a particular example, each execution pipeline may decode a portion of the first and the second instruction, and the first execution pipeline may execute the first instruction and the second execution pipeline may execute the second instruction, concurrently. For example, the second execution pipeline may decode a portion of the first instruction to retrieve a bit value or to determine a value associated with a portion of the first instruction.

Continuing to 506, the execution pipeline determines whether to commit the result. If the first result of executing the first instruction indicates that the second result of executing the second instruction should be committed (i.e., written to the general register file, to main memory, to a cache, to another memory, or any combination thereof), the method advances to 508 and the second result of executing the second instruction is committed. Alternatively, if the first result indicates that the second result should not be committed, the method advances to 510 and the commitment of the second result is canceled. In this instance, the method includes selectively committing the second result of executing the second instruction based on a first result related to executing of the first instruction. The method terminates at 512.

In a particular embodiment, the method includes extracting (reading) the first and second instructions from the packet in parallel before execution. The first result of the first instruction may include a predicate result. The first instruction may be compare instruction or another type of instruction that generates a predicate. The predicate may provide an early indication of whether a branch or change of flow will be taken. In a particular example, a store instruction may be conditional based on a compare instruction. In this instance, a write back operation at the write back stage of an execution pipeline may be canceled based a result of the compare.

In another particular embodiment, the packet of instructions can include a third instruction that uses predicate data from a concurrently executed instruction. In a particular example, a first vector is merged with a second vector based on the data to produce merged data, and a third vector is output based on the merged data according to the data from the predicate register.

In another example, the first instruction is a compare instruction and the second instruction is a jump instruction. In this example, the method includes decoding a portion of the first and second instructions to predict whether the second result will be committed and fetching subsequent packets according to the prediction.

In a particular embodiment, the second instruction can include a bit or indicator that indicates that the first result of the compare instruction should be used by the second instruction. The first result is made available to the second instruction so that the second instruction can determine a correct result before the second result is committed. In another particular example, the method can include canceling exceptions triggered by execution of the second instruction when the second result is not committed.

In another particular example, the method may include executing instructions in parallel and determining whether one of a first instruction and a second instruction has a valid predicate based on a bit in a predicate register. The method can also include committing one, but not both, of the first result and the second result, according to the valid predicate.

In another particular example, the method can include writing the first result to a first address and writing the second result to a second destination address in parallel. Additionally, the method can include discarding the second result when the first result indicates that the second result should be discarded. Committing a result can refer to performing one of a write back operation, a store operation, a load operation, an arithmetic operation, and a change of flow operation, such as a jump or branch operation.

Figure 6:
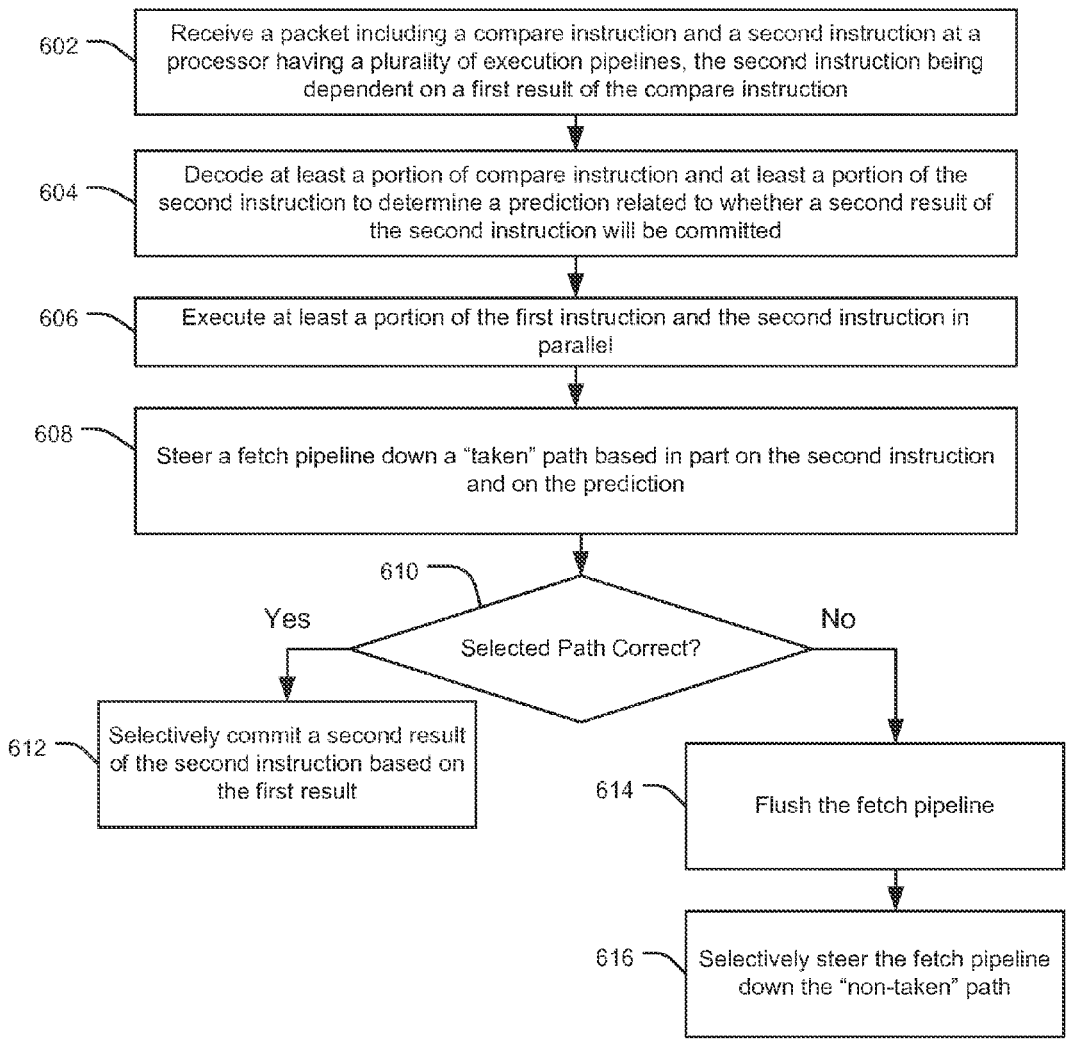
FIG. 6 is a flow diagram of a particular illustrative embodiment of a method of steering a fetch pipeline according to a predicted conditional change of flow.

FIG. 6 is a flow diagram of a particular illustrative embodiment of a method of steering a fetch pipeline according to a predicted conditional change of flow. At 602, the method includes receiving a packet including a compare instruction and a second instruction at a processor having a plurality of parallel execution pipelines. The second instruction is dependent on the compare instruction. Advancing to 604, the method further includes decoding the compare instruction and the second instruction to determine a prediction related to whether the second instruction will be committed. In a particular example, the prediction may be a static or dynamic predication made by prediction logic within the sequencer or at the execution unit. Proceeding to 606, the method includes executing the first instruction and the second instruction in parallel.

Advancing to 608, the method includes steering a fetch pipeline down a "taken" path based in part on the second instruction and on the prediction. For example, the fetch pipeline may be loaded with instructions related to the taken path. Continuing to 610, if the "taken" path is correct, the method advances to 612 and a second result of the second instruction is selectively committed based on the first result.

Otherwise, at 610, if the selected path is not correct, the method advances to 614 and the fetch pipeline is flushed. Proceeding to 616, the method includes selectively steering the fetch pipeline down the "non-taken" path (i.e., the path that was not predicted at 604).

In a particular example, the branch may be a speculative branch. If prediction logic predicts that the speculative branch will be taken, the fetch pipeline may be loaded according to the prediction. If the prediction is incorrect, the pipeline can be flushed and steered to a different path.

In a particular example, selectively steering the fetch pipeline includes initiating retrieval of instructions from memory based on a predicted change of flow when the second instruction is a change of flow instruction and when the prediction indicates that the change of flow instruction is likely to be committed. In another example, selectively steering the fetch pipeline includes initiating retrieval of instructions related to a change of flow from memory based on the prediction, when the prediction indicates a change of flow. Alternatively, retrieval is not initiated when the prediction does not indicate the change of flow. In a particular example, the retrieved instructions are deleted from the fetch pipeline after the prediction is determined to be incorrect.

In another example, the second instruction includes an instruction notation indicating that the second instruction uses the first result of the compare instruction. The first result is available to the second instruction so that the second instruction can determine a correct result before the second result is committed. In a particular embodiment, exceptions triggered by execution of the second instruction are canceled when the second result is not committed. In another example, the method also includes determining whether one of the first instruction and the second instruction has a valid predicate and committing one, but not both, of the first result and the second result, according to the valid predicate.

Figure 7:
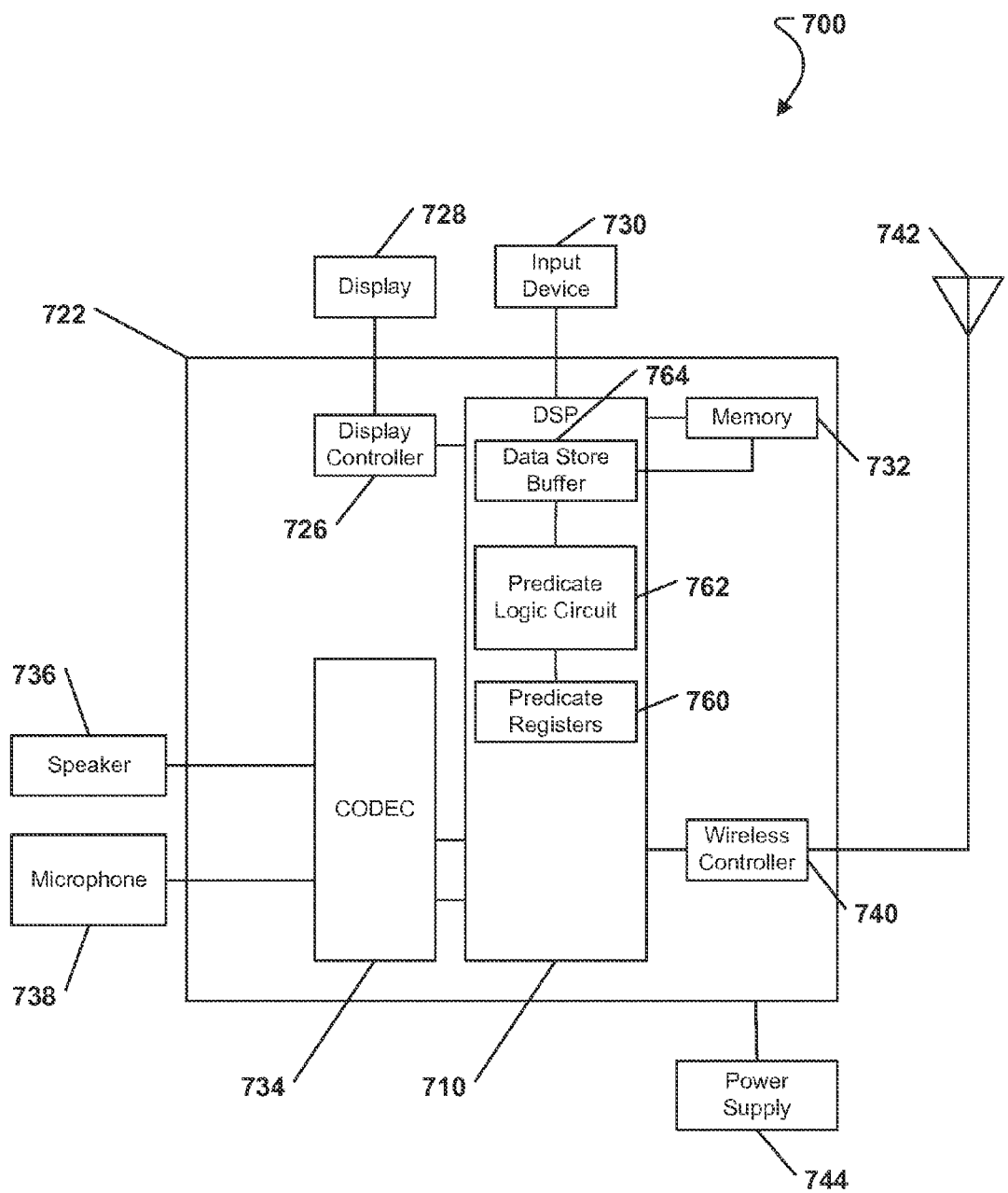
FIG. 7 is a block diagram of a representative portable communication device including logic to conditionally commit parallel-executed instructions.

FIG. 7 is a block diagram of an embodiment of a system to adapted to process dependent instructions concurrently, illustrated as a portable communications device 700. The portable communications device 700 includes a digital signal processor (DSP) 710 that has predicate registers 760, a predicate logic circuit 762, and a data store buffer 764. In a particular embodiment, the DSP 710 may be a multi-threaded processor, such as the processors 100 and 200 illustrated in FIGS. 1 and 2. The DSP 710 may be adapted to utilize the predicate registers 760 and the predicate logic circuit 762 to conditionally commit parallel-executed instructions that depend on one another, such as a compare instruction and a branch instruction that uses the result of the compare. The portable communications device 700 includes an on-chip system 722 that includes a processor, such as a digital signal processor 710. The DSP 710 includes the predicate registers 760 and the predicate logic circuit 762, as described with respect to FIGS. 1-3 and 5-6. In a particular illustrative embodiment, the predicate registers 760 and the predicate logic 762 may be used to enhance processing efficiency by allowing a first execution pipeline to share a compare result with a second execution pipeline that is processing a dependent instruction that uses the compare result, within the same execution cycle. Additionally, the predicate registers 760, the predicate logic 762 and the data store buffer 764 may be utilized to conditionally commit results to memory and to cancel or kill write back operations when the condition is not met.

FIG. 7 also shows a display controller 726 that is coupled to the digital signal processor 710 and to a display 728. Moreover, an input device 730 is coupled to the digital signal processor 710. Additionally, a memory 732 is coupled to the digital signal processor 710. A coder/decoder (CODEC) 734 can also be coupled to the digital signal processor 710. A speaker 736 and a microphone 738 can be coupled to the CODEC 734.

FIG. 7 also indicates that a wireless controller 740 can be coupled to the digital signal processor 710 and to a wireless antenna 742. In a particular embodiment, a power supply 744 is coupled to the on-chip system 722. Moreover, as illustrated in FIG. 7, the display 728, the input device 730, the speaker 736, the microphone 738, the wireless antenna 742, and the power supply 744 can be external to the on-chip system 722. However, each is coupled to a component of the on-chip system 722.

In a particular illustrative embodiment, the predicate logic circuit 762 and the predicate registers 760 may be used to eliminate or reduce undesired write back operations, thereby enhancing the overall performance of the portable communications device 700. Additionally, the predicate logic circuit 762 and the predicate registers 760 may be used to conditionally perform various functions, allowing dependent instructions to be executed in parallel and discarding undesired results without an overhead penalty in terms of pipeline stalls, enhancing the performance of the device 700.

It should be understood that while the predicate logic circuit 762 and the predicate registers 760 are depicted as separate components of the DSP 710, the predicate control circuit 762 and the predicate registers 760 may instead be integrated into a control circuit, such as the sequencer 114 illustrated in FIG. 1. Similarly, it should be understood that the predicate logic circuitry 762 and the data store buffer 764 may be integrated into execution units of the multi-threaded processor.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

What is claimed is:

1. A method comprising:
receiving an instruction packet including a first instruction and a second instruction that is dependent on the first instruction at a processor having a plurality of parallel execution pipelines including a first execution pipeline and a second execution pipeline, wherein the instruction packet includes an indication that the second instruction is to be executed using a first result associated with the first instruction instead of a result associated with a previously executed instruction from another packet;
executing in parallel at least a portion of the first instruction and at least a portion of the second instruction; and
selectively committing a second result of executing the at least a portion of the second instruction with the second execution pipeline based on the first result.

2. The method of claim 1, wherein the instruction packet is a very long instruction word (VLIW) instruction packet, wherein the first instruction is a compare instruction, and wherein the second instruction is a load instruction, a store instruction, an arithmetic instruction, or a combination thereof.

3. The method of claim 1, wherein the instruction packet includes at least two conditional instructions that target a same destination register.

4. The method of claim 3, further comprising writing data related to the first result to a predicate register, wherein the second instruction receives the data related to the first result from the predicate register, and wherein the data related to the first result replaces a previous result stored at the predicate register.

5. The method of claim 1, wherein selectively committing the second result comprises:
writing the second result to a memory store buffer; and
selectively canceling a write back operation to a register when the first result is available.

6. The method of claim 1, wherein the second instruction comprises a conditional change of flow instruction, the method further comprising:
decoding a portion of the first instruction and the second instruction at a decode stage of one of the first execution pipeline and the second execution pipeline;
performing a static prediction based on the decoded portion indicating whether the conditional change of flow instruction is likely to be committed.

7. The method of claim 6, further comprising steering an instruction fetch pipeline to retrieve instructions related to a change of flow when the static prediction indicates that the conditional change of flow instruction is likely to be committed.

8. The method of claim 1, further comprising conditionally writing back the second result to a destination register after determining whether to commit the second result.

9. The method of claim 1, wherein the first instruction comprises a compare instruction and the second instruction comprises a change of flow instruction, the method further comprising:
setting a predicate bit in a predicate register based on the first result; and
selectively committing to perform a change of flow action indicated by the change of flow instruction based on a value of the predicate bit after executing the change of flow instruction.

10. The method of claim 1, further comprising decoding a portion of the instruction packet to determine whether the second pipeline has the first result to be used by the first execution pipeline.

11. The method of claim 1, further comprising determining at the second execution pipeline that the first execution pipeline has the first result upon which the second instruction depends.

12. The method of claim 1, further comprising decoding a portion of the first instruction at the second execution pipeline to determine a value associated with the portion of the first instruction.

13. The method of claim 1, further comprising extracting the first instruction and the second instruction in parallel from the instruction packet before execution of the first instruction and the second instruction.

14. A method comprising:
receiving a packet including a compare instruction and a second instruction at a processor having a plurality of parallel execution pipelines, the second instruction being dependent on the compare instruction, wherein the packet includes an indication that the second instruction is to be executed using a first result associated with the compare instruction instead of a result associated with a previously executed instruction from a second packet;
decoding the compare instruction and the second instruction to determine a prediction related to whether the second instruction will be committed;
executing the first instruction and the second instruction in parallel; and
selectively steering a fetch pipeline based in part on the second instruction and on the prediction.

15. The method of claim 14, wherein selectively steering the fetch pipeline comprises initiating retrieval of instructions from memory based on a predicted change of flow when the second instruction is a change of flow instruction and when the prediction indicates that the change of flow instruction is likely to be committed.

16. The method of claim 14, wherein selectively steering the fetch pipeline comprises initiating retrieval of instructions related to a change of flow from memory based on the prediction when the prediction indicates a change of flow, but not initiating retrieval when the prediction does not indicate the change of flow.

17. The method of claim 15, further comprising deleting the retrieved instructions from the fetch pipeline after the prediction is determined to be incorrect.

18. The method of claim 14, further comprising selectively committing a second result of the second instruction executed with a second execution pipeline based on at least a first result related to the first instruction associated with a first execution pipeline.

19. The method of claim 18, wherein the first result is available to the second instruction before the second result is committed.

20. The method of claim 19, further comprising canceling exceptions triggered by execution of the second instruction when the second result is not committed.

21. The method of claim 14, further comprising:
determining whether one of the first instruction and the second instruction has a valid predicate based on a bit in a predicate register; and committing one, but not both, of a first result of the first instruction and a second result of the second instruction, based on the instruction having the valid predicate.

22. The method of claim 14, wherein the indication included in the packet is based on a bit value in the second instruction indicating that the first result associated with the compare instruction is to be used by the second instruction.

23. The method of claim 14, wherein the indication included in the instruction packet is a flag bit in the second instruction.

24. A processor comprising:
   multiple execution pipelines adapted to execute instructions in parallel, the multiple execution pipelines including a first execution pipeline to execute a first instruction of an instruction packet to determine a first result and a second execution pipeline to execute a second instruction of the instruction packet that is dependent on the first result determined from the first instruction, the first instruction and the second instruction executed concurrently, the instruction packet including an indication that the second instruction is to be executed using the first result determined from the first instruction instead of a result associated with a previously executed instruction from another packet; and
   logic circuitry adapted to provide the first result from the first execution pipeline determined from execution of the first instruction to the second execution pipeline for use by the second instruction.

25. The processor of claim 24, wherein the logic circuitry provides the first result to the second execution pipeline before a second result associated with the second execution pipeline is committed.

26. The processor of claim 24, further comprising a predicate register accessible to the multiple execution pipelines and adapted to store data related to the first result.

27. The processor of claim 24, further comprising a sequencer to receive a packet of instructions including the first instruction and the second instruction, the sequencer to provide the first instruction to the first execution pipeline and the second instruction to the second execution pipeline.

28. The processor of claim 27, wherein the first instruction comprises a compare instruction, and wherein the second instruction depends on a result of execution of the compare instruction, and wherein the second instruction comprises at least one of an arithmetic instruction, a logical operation instruction, a load instruction, a store instruction, a branch instruction, and a jump instruction.

29. The processor of claim 24, further comprising a memory buffer coupled to the multiple execution pipelines to provide a delay sufficient to obtain the first result from execution of the first instruction before a second result from execution of the second instruction is committed.

30. A processor comprising:
   means for receiving an instruction packet including a first instruction and a second instruction that is dependent on the first instruction at a processor having a plurality of parallel execution pipelines including a first execution pipeline and a second execution pipeline, wherein the instruction packet includes an indication that the second instruction is to be executed using a first result associated with the first instruction instead of a result associated with a previously executed instruction from another packet;
   means for executing in parallel at least a portion of the first instruction and at least a portion of the second instruction; and
   means for selectively committing a second result of executing the at least a portion of the second instruction with the second execution pipeline based on the first result related to execution of the first instruction with the first execution pipeline.

31. The processor of claim 30, further comprising:
   means for writing the second result to a memory store buffer; and
   means for selectively canceling a write back operation to a register when the first result is available.

32. The processor of claim 30, wherein the instruction packet includes an instruction to calculate a condition, wherein the condition is calculated during execution of the second instruction, and wherein the calculated condition is used during execution of the second instruction.

33. A non-transitory computer-readable medium including:
   an instruction packet including a first instruction and a second instruction that is dependent on the first instruction, the instruction packet executable by a processor having a plurality of parallel execution pipelines including a first execution pipeline and a second execution pipeline, wherein the instruction packet includes an indication that the second instruction is to be executed using a first result associated with the first instruction instead of a result associated with a previously executed instruction from another packet, wherein at least a portion of the first instruction and at least a portion of the second instruction are executable in parallel, and wherein a second result of executing the at least a portion of the second instruction with the second execution pipeline based on the first result is selectively committed.

34. The non-transitory computer-readable medium of claim 33, wherein the instruction packet is a very long instruction word (VLIW) instruction packet, wherein the first instruction is a compare instruction, and wherein the second instruction is a load instruction, a store instruction, an arithmetic instruction, or a combination thereof.

* * * * *